(12) United States Patent
Andre (10) Patent No.: US 6,241,270 B1
(45) Date of Patent: *Jun. 5, 2001

(54) MECHANICAL COUPLING CONNECTING A TRUCK AND A TRAILER WITH MEANS FOR CONTROLLING THE TRAJECTORY OF THE TRAILER

(75) Inventor: Jean-Luc Andre, Obernai (FR)

(73) Assignee: Lohr Industrie, Hangenbieten (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/721,091

(22) Filed: Sep. 27, 1996

(30) Foreign Application Priority Data

Sep. 28, 1995 (FR) .................................... 95 11586

(51) Int. Cl.⁷ .................................... B62D 53/00
(52) U.S. Cl. ................ 280/499; 280/456.1; 280/458; 280/492
(58) Field of Search ................ 280/406.1, 442, 280/456.1, 458, 459, 492, 494, 457, 461.1, 493, 499

(56) References Cited

U.S. PATENT DOCUMENTS

| | | | |
|---|---|---|---|
| 1,336,665 | * | 4/1920 | Underhill et al. ............... 280/456.1 |
| 1,429,734 | * | 9/1922 | Hoffman ............................... 280/442 |
| 1,758,951 | | 5/1930 | Johnson . |
| 2,133,202 | * | 10/1938 | Lantz ..................................... 280/492 |
| 2,256,557 | * | 9/1941 | Gustin, Jr. ............................. 280/494 |
| 2,568,261 | * | 9/1951 | Stade .................................... 280/499 |
| 2,653,032 | * | 9/1953 | Ellis ...................................... 280/442 |
| 2,685,454 | * | 8/1954 | Patchett ............................. 280/461.1 |
| 2,843,417 | | 7/1958 | Wahl . |
| 2,898,126 | * | 8/1959 | Loukonen ............................ 280/499 |
| 3,254,905 | * | 6/1966 | Rogers et al. ....................... 280/458 |
| 3,955,831 | | 5/1976 | Whitchurch . |
| 4,598,926 | * | 7/1986 | Gallatin ................................ 280/459 |
| 5,784,967 | * | 7/1998 | Lohr ..................................... 280/442 |

FOREIGN PATENT DOCUMENTS

| | | |
|---|---|---|
| 17 71 844 | 8/1958 | (DE) . |
| 31 45 871 | 6/1983 | (DE) . |
| 31 50 024 | 6/1983 | (DE) . |
| 41 36 334 | 4/1993 | (DE) . |
| 2 517 604 | 6/1983 | (FR) . |

* cited by examiner

Primary Examiner—Daniel G. DePumpo
(74) Attorney, Agent, or Firm—Davis & Bujold, P.L.L.C.

(57) ABSTRACT

According to the invention, the connection between the truck (1) and the trailer (2) consists of a pivoting linkage (13, 19, 37) pivoting about an axle (43) or (26) generally perpendicular to it, forming part of a pivot center (18) attached in overlapping arrangement to the front part of the tailer chassis, and of at least one oblique connecting rod (20, 39, 40) of constant length, extending obliquely in relation to the straight line direction between the truck (1) and the trailer (2). The invention is of interest to vehicle manufacturers, especially trailer manufacturers.

5 Claims, 10 Drawing Sheets

MECHANICAL COUPLING CONNECTING A TRUCK AND A TRAILER WITH MEANS FOR CONTROLLING THE TRAJECTORY OF THE TRAILER

The present invention concerns a mechanical coupling connecting a truck and a trailer including a means for controlling the trajectory of the trailer, especially for a truck and a trailer with a central axle, known as a balanced trailer.

The mechanical coupling according to the invention consists of a linkage and at least one oblique, rigid connection, articulated at one end to the trailer and at the other end to the truck.

BACKGROUND OF THE INVENTION

Generally speaking, automotive couplings should allow the the trailer's trajectory to shift into the best position for holding the road when the truck-trailer assembly is turning or on a curve.

SUMMARY OF THE INVENTION

Present systems for shifting the trailer's trajectory not only eliminate telescoping between the trailer, the truck and their contents during turns, but also exercise actual control over the trailer's trajectory, so its position is corrected during turns and when exiting curves.

The goal of the present invention is to provide a simple, completely mechanical means for achieving this result, specifically, by using a linkage which may of constant length, or a passive, telescoping linkage which extends and retracts independently, that is, one which is not activated by fluid or the like, and one or two rigid, oblique connecting rods of constant length, articulated to the tractor and to the truck.

Another aim of the invention is to provide a simple mechanical coupling that allows the trailer's trajectory to shift so it can transport loads projecting beyond the front of the trailer and/or the rear of the truck.

Yet another aim of the invention is to provide a coupling that is entirely mechanical and as simple as possible, which is both economical and dependable.

Finally, the invention permits use of a protective cover between the truck and the trailer which is deformable according to an arc shape.

More specifically, these results are obtained using a trailer with central axles, known as a balanced trailer.

To achieve this, there is a mechanical coupling between the truck and the trailer formed first of a linkage, the front extremity of which is hooked onto the rear of the truck, for example, in an overlapping arrangement, and the rear extremity of which is attached to a pivoting means about a generally vertical axle attached to the trailer chassis; and secondly, there is at least one connecting rod obliquely disposed in relation to a straight line direction, which is rigid and of constant length, and articulated at one end to the rear of the truck, and at the other end to the rear of the trailer.

According to an improved variation, the connection formed of a single oblique rod is doubled by an additional oblique rod, with the rods forming a cross, in a straight line configuration, along the diagonals in the space formed between the truck and the trailer.

The invention allows the use of a short coupling and offers several additional, important advantages, such as reducing the space between the truck and trailer in order to transport indivisible items in overlapping position, or even cargo projecting beyond the rear of the truck and/or the front of the trailer.

A further advantage is reduced cost, as the means for implementing the device are both simple and passive.

BRIEF DESCRIPTION OF THE PREFERRED EMBODIMENTS(S)

Other characteristics and advantages of the invention will be apparent from the following description, given by way of example, and the accompanying drawings, in which.

DESCRIPTION OF THE PREFERRED EMBODIMENT(S)

The present invention concerns a mechanical coupling connecting a motorized vehicle, denoted here as truck 1 for reasons of simplification, and a trailer 2.

Trailer 2 is shown as a trailer with central axles 3 and 4 and will be described as such.

If other types of trailers are suitable, it is obvious that they fall within the scope of the invention.

Truck 1 has a cab 5 and a chassis 6, the latter being surmounted by a fixed or removable carriage 7. The purpose of the carriage may be to transport cars on platforms or individual cargo plates, but this is not necessarily the case.

The same is true for the trailer comprising a chassis 8, which may have a carriage 9 attached to it for transporting cars on platforms or individual cargo plates.

Figure 1:
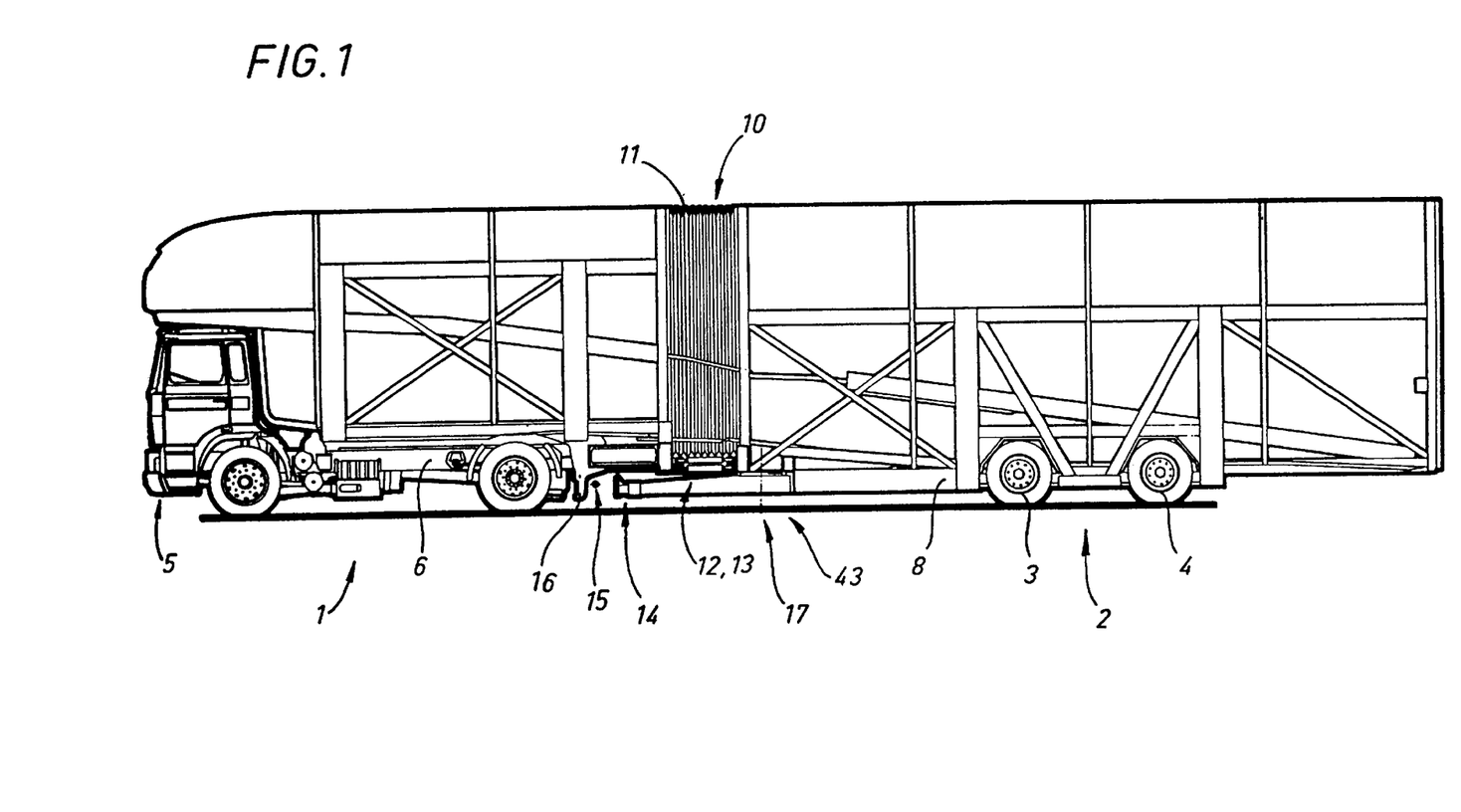
FIG. 1: a general profile of a first embodiment of the truck-trailer unit with a protective cover.
Figure 2:
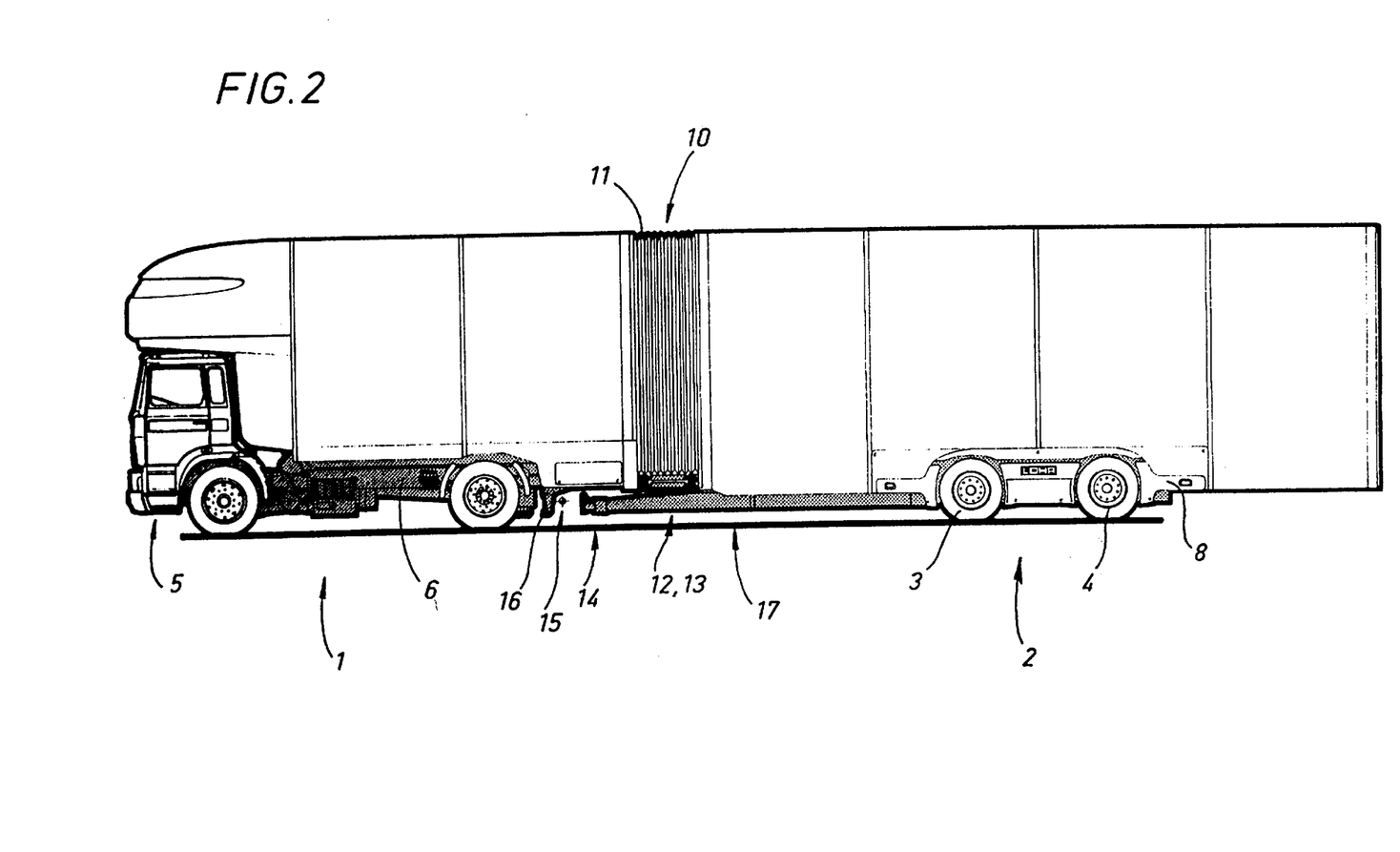
FIG. 2: a general profile of the truck-trailer unit and protective cover showing a completely enclosed embodiment.

There is an intermediate connecting space 10 between the vehicles (the truck and the trailer), which may be protected by a bellows-like cover 11, as shown in FIGS. 1 and 2.

The present invention focuses on the connection between truck and trailer, forming a mechanical coupling 12, which can control the trajectory of the trailer, formed of a pivoting linkage and at least one connection which is oblique in relation to the straight line direction.

FIGS. 1 and 2 show the truck-trailer unit with any type of pivoting linkage 13. As will be seen below, the pivoting linkage may be rigid and of constant length, as in the first embodiment with a single oblique connection, or it may be independent, telescoping and passive, as in the second embodiment with a double oblique connection.

Front extremity 14 of linkage 13 is connected at a coupling point 15 with a hook supported by a transverse mechanical assembly 16 integral with truck chassis 6 or with the carriage, which may have a cantilevered rear extension; rear extremity 17, forming a portion of or constituting one of the elements of a pivot center 18, is attached so that it overlaps the front of trailer chassis 8 or is near it.

According to the two variations of the first embodiment shown in FIGS. 3 through 10, pivoting linkage 13 is a rigid pivoting linkage 19 pivoting about pivot center 18. The length L of said linkage is constant and the oblique connection consists of a rigid connecting rod 20 of constant length D. It obliquely traverses the longitudinal median plane of the straight line of the vehicle along a diagonal and at its extremities, it is articulated either to a rear corner 21 or 22 of the truck, or to a front corner 23 or 24 to the trailer.

According to the first variation, pivot center 18 is in made the shape of a bar on the front carriage 25 attached so that it extends beyond the front portion of trailer chassis 8.

A second variation of the first embodiment uses a pivot center 18 equivalent to the front carriage bar of the first variation, of the first variation, with the same results According to this second variation, bar 25 is replaced by a pivoting end axle 26 attached vertically to the bottom surface of trailer chassis 8 in a median position perpendicular to the chassis. The assembly is completed by a trailer connection-support element 27 at the front. In the example shown, this connection-support element 27 consists of an arc-shaped track 28 and a sliding-support on said track on a support zone 29 formed of the linkage surface opposite arc-shaped track 28, completed by a sliding assemblage connection 30 between the linkage and the arc-shaped track structure 18. This connection maintains the front portion of trailer chassis 8 in contact with the linkage and thus eliminates any play between the linkage and the trailer if the rear of the trailer is hauling heavier cargo.

This connection offers additional security in case pivoting axle 26 breaks.

Figure 10:
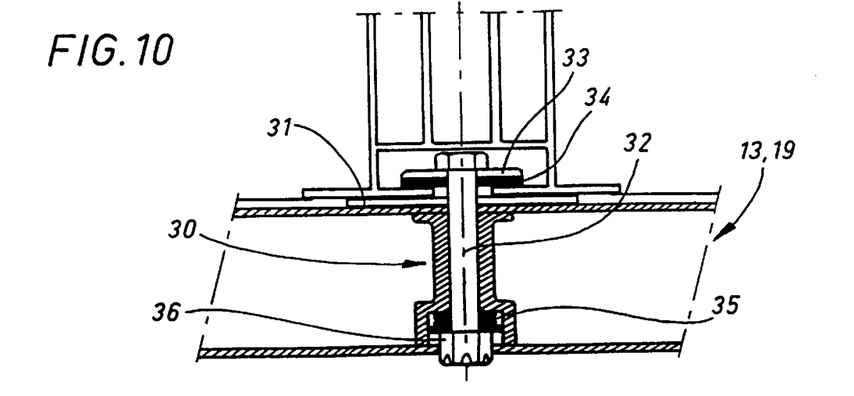
FIG. 10: a longitudinal cross-section taken along a line perpendicular to the trailer chassis, along the linkage and through the track showing the connection between the linkage and the track.
Figure 11:
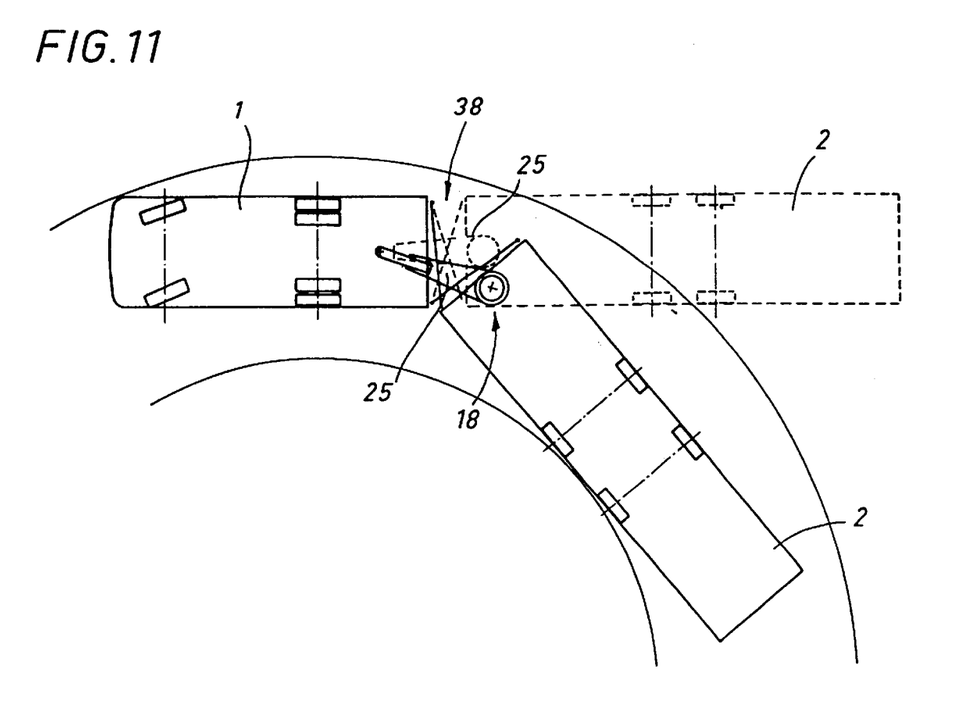
FIG. 11: a plan schematic view of a variation having an extendible linkage with two crossed rods, shown in straight line position and in turning position.
Figure 12:
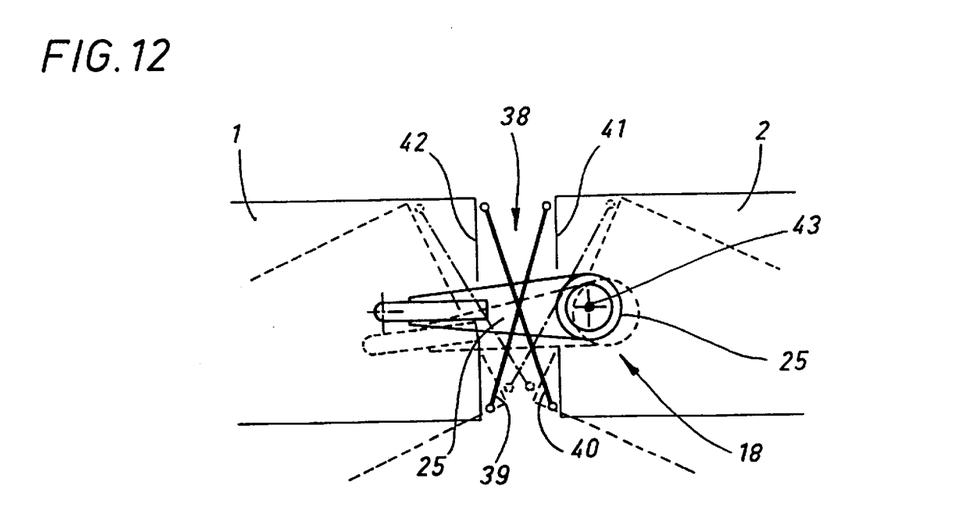
FIG. 12: a geometric view showing the two positions, one of which is the straight line position, of the means constituting the coupling of the embodiment shown in FIG. 11.
Figure 13:
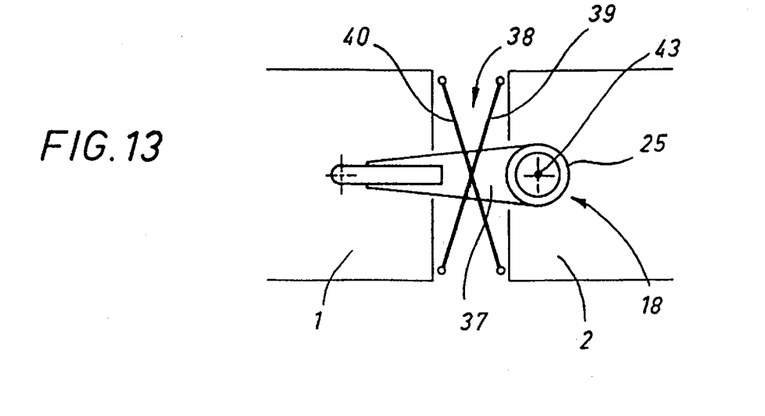
FIGS. 13 through 15: successive schematic representations showing the extension of the linkage when the linkage is an extendible one.
Figure 14:
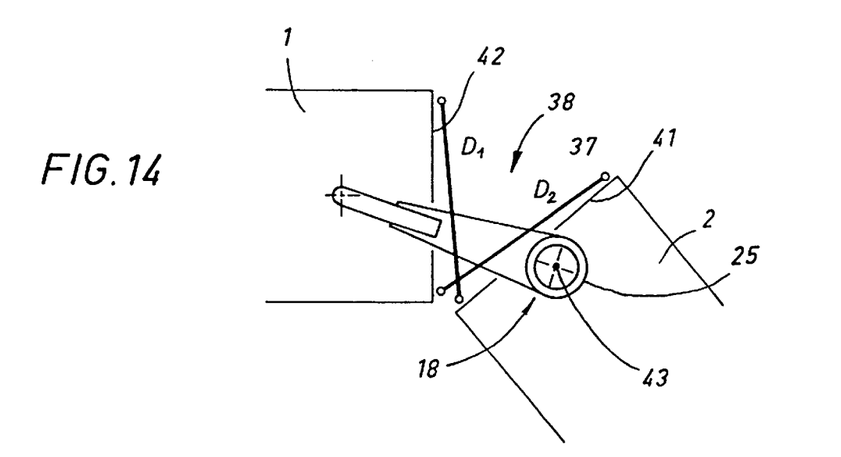
Figure 15:
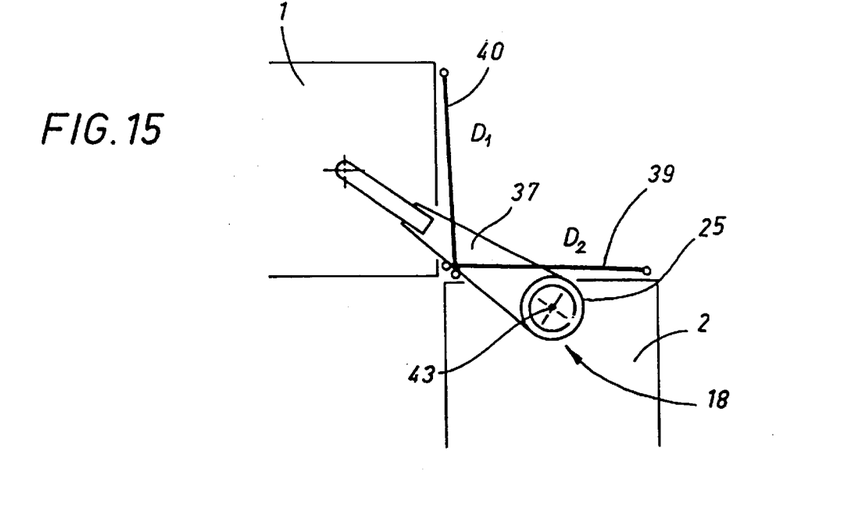

More specifically, as is shown in the cross-section in FIG. 10, the arc-shaped track has areas on its lower surface which are either lubricated, or are covered, or have an additional interposed layer 31 made of anti-friction material. Connection 30 uses a connecting bolt 32, and the head of the bolt projects through a flat washer 33 and the anti-friction material 34 to contact the internal surfaces of the edges of the arc-shaped track.

For added stability when the vehicle is in motion, connecting bolt 32 is pre-constrained, perhaps by a flexible washer 35 at the lower end near locking screw 36.

Obviously, the track and connection unit could be replaced by an equivalent sliding-support means.

The end articulations of rigid oblique rod 20 are either ball-joint articulations or articulations which pivot several additional degrees, providing enough play to counteract rolling and pitching motions.

Figure 3:
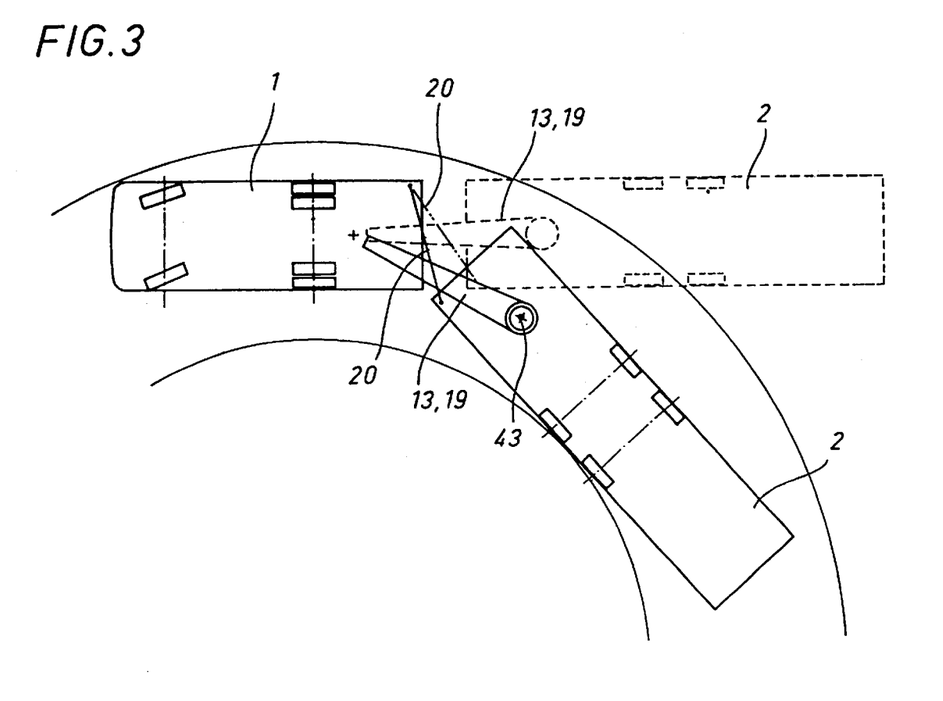
FIG. 3: a schematic plan view of an embodiment having a rigid linkage of constant length shown in straight line position and in turning position.

Observation of FIGS. 5 through 10 will show that the relation between truck direction and trailer direction is controlled by the constant length L of the pivoting linkage and the constant length D of oblique connecting rod 20. The linkage alone absorbs the stress resulting from the transfer of the vertical trailer load On curves, oblique rod 20 pushes or pulls the opposite corner of the trailer, thus forming a connection allowing the trajectory to conform to the road during turns, as shown in FIG. 3. The diagonal disposition of oblique rod 20 is responsible for this effect.

Figure 16:
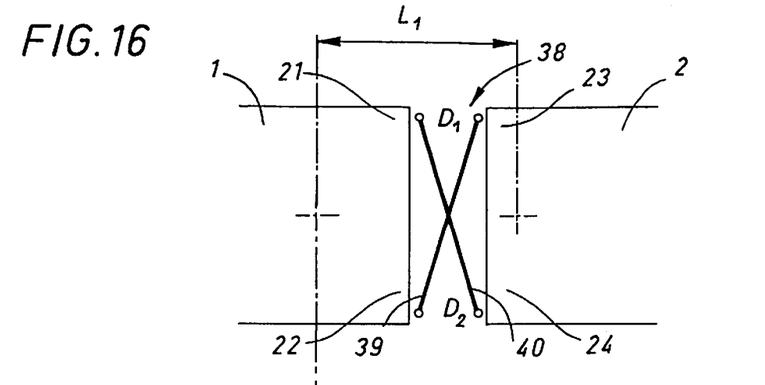
FIGS. 16 through 18: successive schematic representations showing the variation in the space between the truck and the trailer in the embodiment having an extendible linkage.
Figure 17:
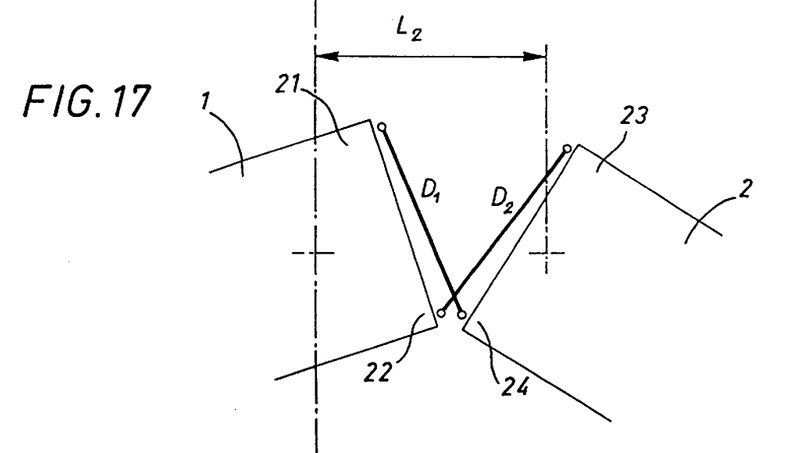
Figure 18:
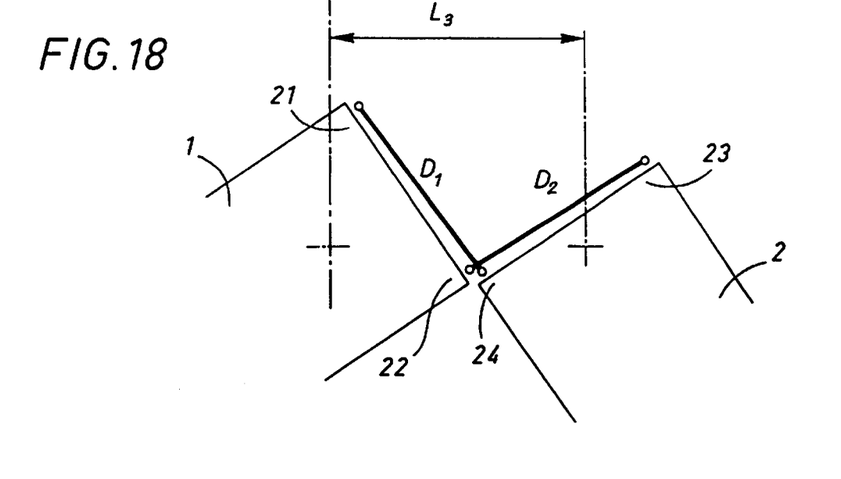

According to the second embodiment, pivoting linkage 13 is a mechanical, telescoping linkage 37, which is completely independent and passive, that is, there is no active means for extending or retracting it, but rather, it slides freely without any restraints such as brakes or shock absorbers, and assumes various lengths L2 ranging, for example from a minimum length L1 to a maximum length L3 (FIGS. 16 through 18). Furthermore, it is composed of simple mechanical elements. For example, it may consist of a hollow beam housing a second sliding beam, forming the bar of the pivoting linkage.

Naturally, pivoting linkage 37 has security stops to limit its path during acceleration or braking.

According to this second form of embodiment, pivoting telescoping linkage 37 is completed by a double articulated connection 38 of two rigid rods 39 and 40, consisting of the symmetrical addition to first rod 39 of a second oblique, rigid rod 40 articulated at one end to the rear of the truck and at the other end to the front of the trailer. These two symmetrical rods, called crossed rods 39 and 40, are of equal and constant length D1 and D2; they each extend obliquely and diagonally in relation to the straight line direction, from one of the corners 23, 24 of the upper front portion 41 of the trailer to one of the corresponding corners 21, 22 of the upper rear 42 of truck chassis 6. The corners associated with the end of the same rod are diagonally opposed.

These crossed rods are articulated at their ends either directly or using corner elements integral with the upper front portion 41 of the trailer chassis and the upper rear front 42 portion of the truck chassis.

They are each attached at the level of the extremities using ball joint articulations to absorb rolling and pitching motion.

The linkage alone absorbs the stress resulting from the transfer of the vertical trailer load.

To achieve the first goal, it is desirable for the rods to be as long as possible. Thus, the trajectory of the trailer will overshoot the outline of the truck by the smallest possible extent.

It is thus possible to determine the optimum placement for the articulation points on the upper front portion 41 and rear portion 42, respectively, of the trailer and the truck.

Figure 4:
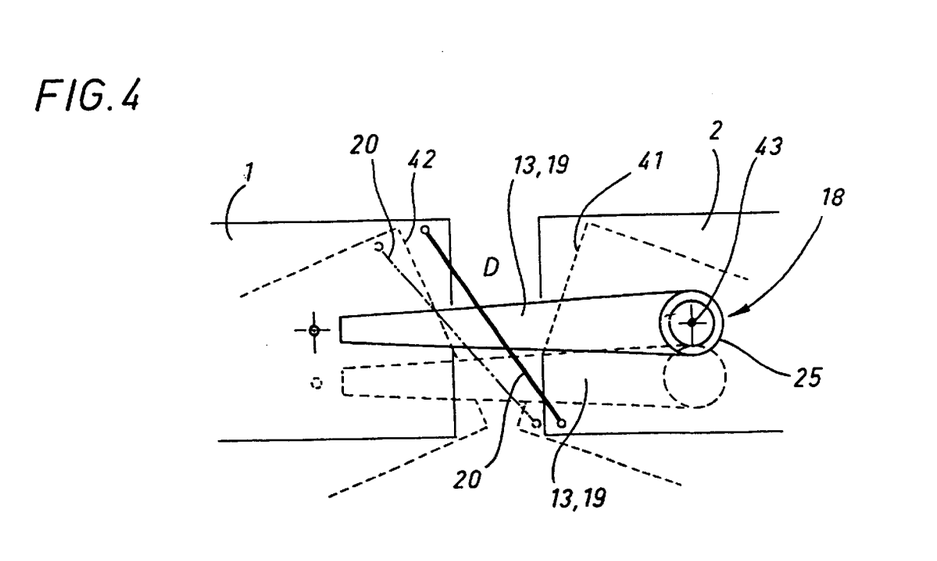
FIG. 4: a composite geometric view showing two positions of the means constituting the coupling shown in the preceding drawing.
Figure 5:
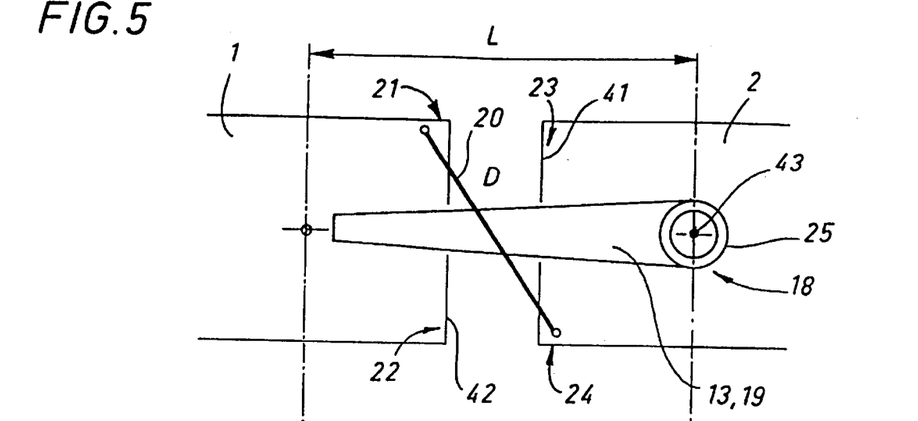
FIGS. 5 through 7: successive schematic representations showing the constant length L of the linkage of the embodiment illustrated above at the end of the linkage.
Figure 6:
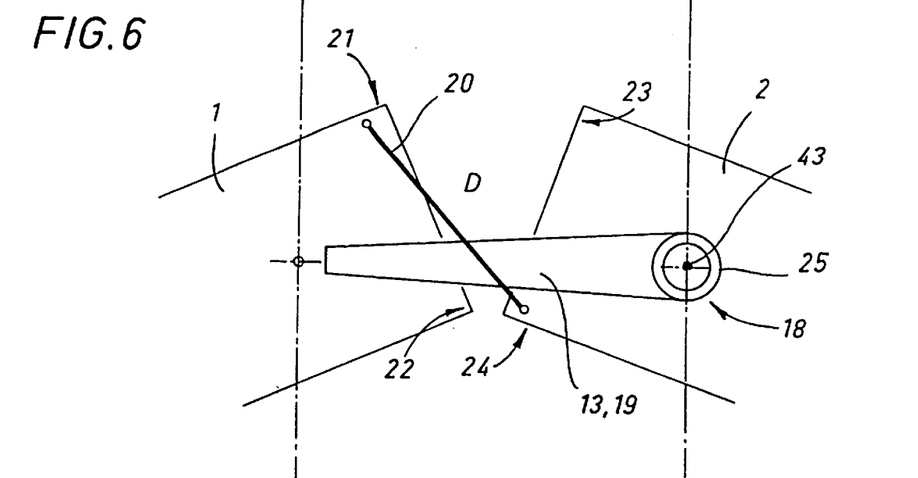
Figure 7:
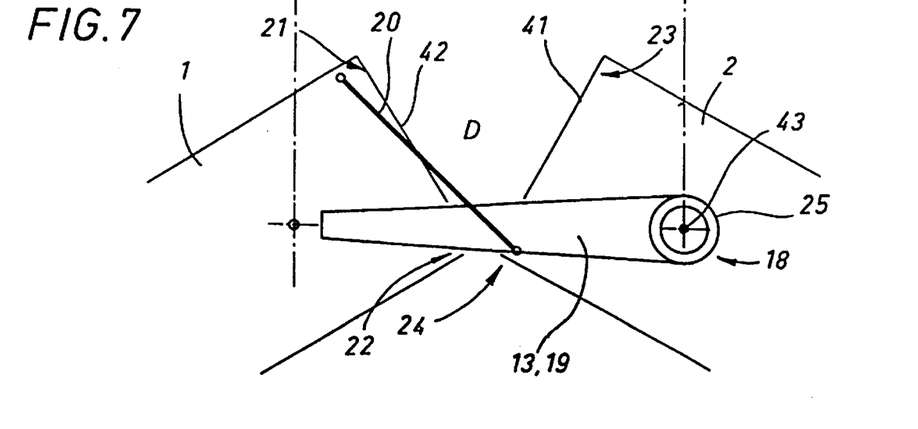

For example, they may be positioned at points 21 through 24 at the level of the bases of the stops, that is, at the front extremity of the trailer chassis and the rear extremity of the truck chassis, or even slightly recessed, below each of the two chassis as shown in FIGS. 4 and 7.

Observation of FIGS. 13 through 18 shows that in the relationship between the orientation of the truck and that of the trailer, the only constants are the lengths DI and D2 of the crossed rods.

As shown in the schematic drawings, the simultaneous, symmetrical function of the two rods is analogous to that of the first embodiment.

The crossed rods prevent opposing corners of the truck and the trailer from telescoping.

Figure 8:
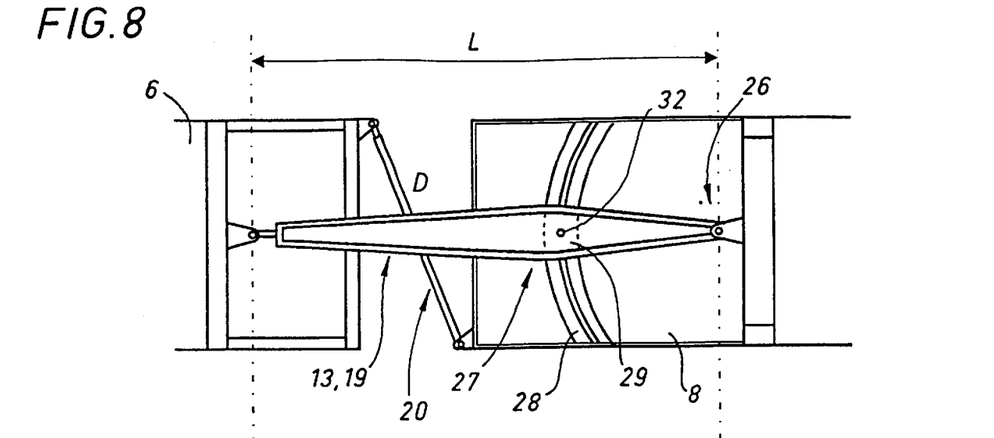
FIGS. 8 and 9: successive schematic representations showing successive schematic representations showing the constant length L of the linkage in straight line position and in turning position in the variation of the first embodiment.
Figure 9:
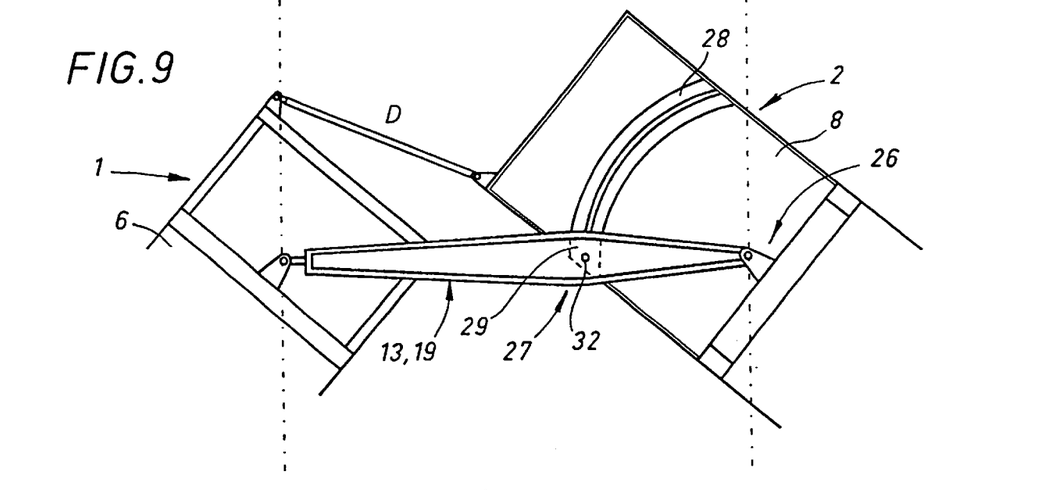

Pivot center 18, according to the variations, consists of the front bar 25 pivoting around an essentially vertical axle 43 (FIGS. 1 through 7 and 11 through 15) or pivoting end axle 26 of the linkage (FIG. 8 and 9).

Insofar as the first variation is concerned, the front bar 25 is attached so that it overlaps the front portion beneath trailer chassis 8. It is conventionally shaped of a circular body, integral with the trailer chassis, to which there is attached a cylindrical element integral with the extremity of the pivoting linkage. The return of the cylindrical element contacts a circle of ball bearings.

Axle 43 of the front bar is preferably inclined forward slightly to improve stability of the vehicle during motion.

It should be noted here that the linkage may also be connected to a removable carriage supported by the truck, rather than directly to the truck.

As shown in FIGS. 16 through 19, the invention offers the important capability transporting a load consisting of connected units which may overlap or project into the intermediate space between the two vehicles, for example, automobiles such as 44, 45 and 46, held on individual plates 47, 48 and 49 equipped with extensions 50, 51 and 52. This makes the invention readily adaptable for transporting vehicles, especially in a truck covered with a tarp, or more generally, a closed truck with a bellows-type cover between the truck and the trailer.

Figure 19:
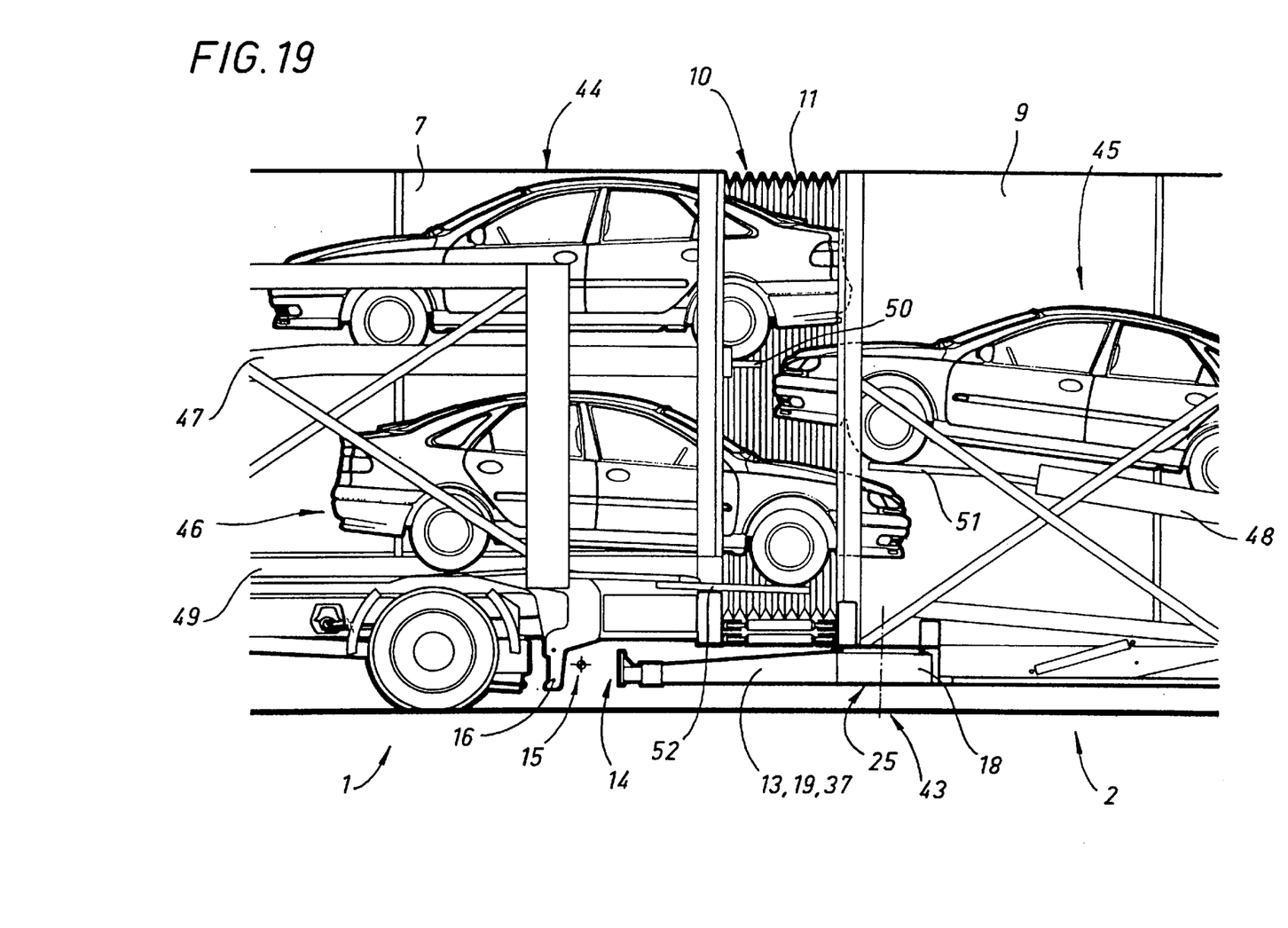
FIG. 19: a profile view of the space between the truck and the trailer showing the overlapping arrangement of the cars, given as an example of how the trailer is loaded with cargo.
Figure 20:
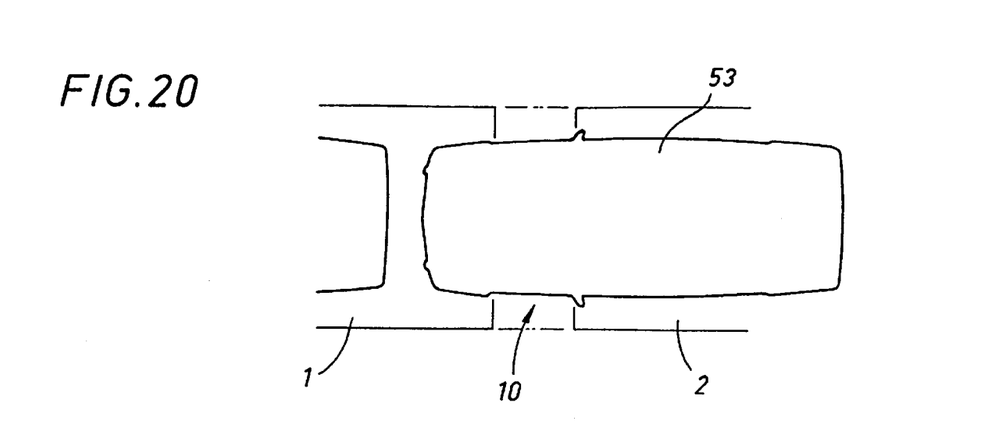
FIGS. 20 through 22: successive schematic representations showing the straight line position and then the turning position of a car as it overlaps the space between the truck and the trailer.
Figure 21:
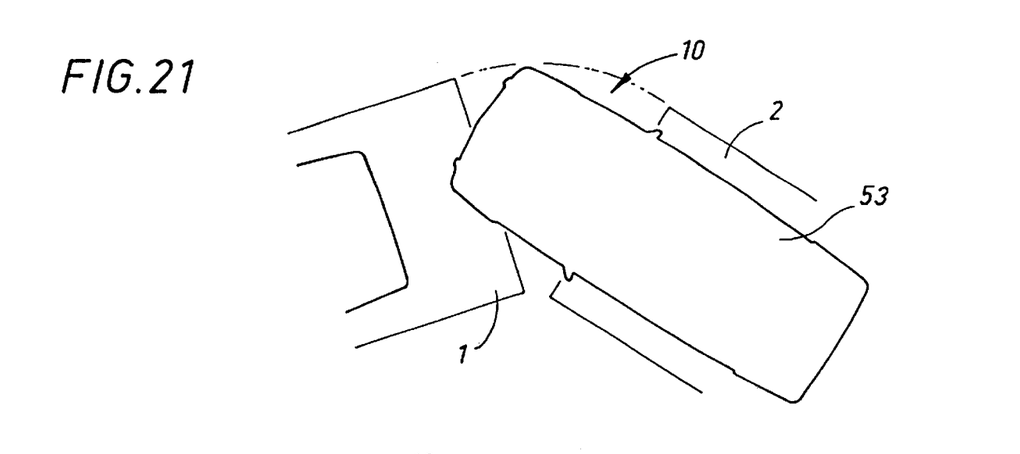
Figure 22:
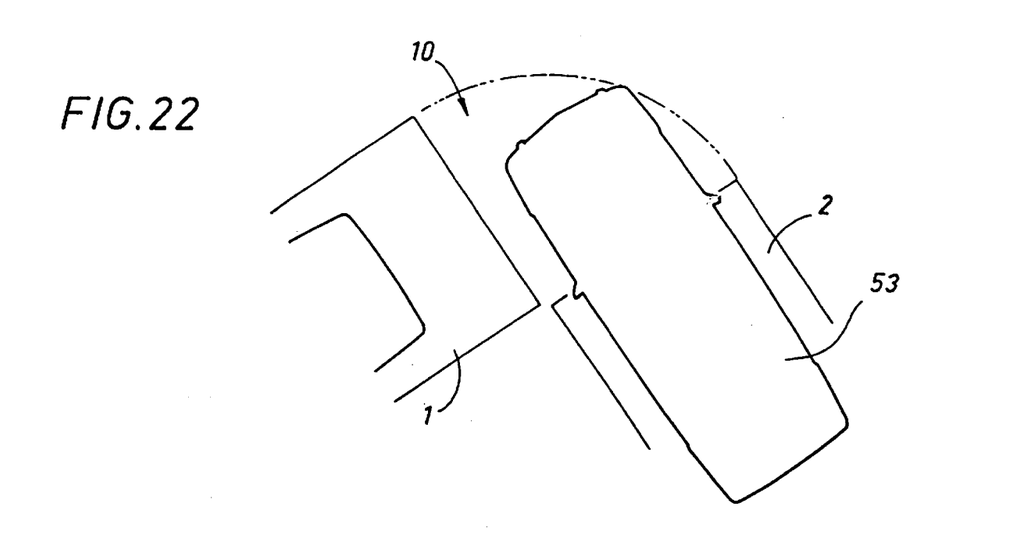

FIGS. 17 through 19 illustrate more particularly how the cargo can extend over intermediate connecting space 10, and they illustrate how intermediate connecting space 10 according to the invention is advantageous on a turn when an automobile overlaps the space. The shifting connection allows the car to overlap beyond the rear limit of the truck, with no risk of telescoping over the nearby truck carriage structures on turns.

What is claimed is:

1. An articulated vehicle comprising a motorized vehicle (1) being coupled to a trailer (2) via a mechanical coupling (1) for facilitating transportation of the trailer (2), the motorized vehicle (1) having a vehicle chassis supporting at least two axles and the trailer (2) having a trailer chassis supporting a non-steerable axle, the non-steerable axle being a fixed, forward most axle of the trailer, the at least two axles of the motorized vehicle (1) and the fixed, forward most non-steerable axle of the trailer (2) each supporting rotatable wheels to facilitate movement of the articulated vehicle, the motorized vehicle (1) and the trailer (2) together defining a vertical longitudinal median plane of the articulated vehicle, and the mechanical coupling controlling a trajectory of the trailer (2) during travel of the motorized vehicle (1), said mechanical coupling comprising:

a pivoting linkage (13) having a front extremity (14) and a rear extremity (17), the front extremity of the pivoting linkage (13) being pivotally connected to a rear portion of the vehicle chassis at a location coincident with the vertical longitudinal median plane of the articulated vehicle, the rear extremity (17) of the pivoting linkage (13) being connected to a pivoting center (18), and the pivoting center (18) being connected to the trailer chassis at a location coincident with the vertical longitudinal median plane of the articulated vehicle;

the pivoting center (18) being connected under the trailer chassis to a portion of the trailer chassis (8) extending between a front of the trailer (2) and the fixed, forward most non-steerable axle and, when the pivoting linkage (13) is connected to the motorized vehicle (1), the pivoting linkage (13) is capable of directly supporting both vertical upward and downward forces applied by a load when being transported by the trailer (2), and the pivoting center (18) defining a geometrical pivoting axis (43) for the pivoting linkage (13); and a constant length single rod being connected between the vehicle chassis (1) and the trailer chassis, the single rod having opposed first and second ends, the first end of the single rod being connected to a rear corner portion of the vehicle chassis and the second end of the single rod being connected to an opposed front corner portion of the trailer chassis such that the single rod obliquely traverses both the vertical longitudinal median plane of the articulated vehicle and the pivoting linkage (13);

the pivoting center (18), which pivots around the geometrical pivoting axis (43), is an assembly which consists of a pivot (26) and a sliding connection (30) supported by the pivoting linkage (13) at a location between the front extremity (14) and the rear extremity (17);

the sliding connection (30) includes a support element (27) which connects the pivoting linkage (13) to the trailer chassis, and the support element is simultaneously displaceable with the pivoting linkage (13) relative to the trailer chassis; and wherein the sliding connection further consists of an arc-shaped track (28) supported by an undersurface of the trailer chassis and the support element (27) engages with and is guided by the arc-shaped track (28).

2. An articulated vehicle comprising a motorized vehicle (1) being coupled to a trailer (2) via a mechanical coupling for facilitating transportation of the trailer (2), the motorized vehicle (1) having a vehicle chassis supporting at least one steerable axle, the trailer (2) having a trailer chassis supporting a non-steerable axle, the non-steerable axle of the trailer being a fixed, forward most axle of the trailer axle, the at least one steerable axle of the motorized vehicle (1) and the fixed, forward most non-steerable axle of the trailer (2) each supporting rotatable wheels to facilitate movement of the articulated vehicle, the motorized vehicle (1) and the trailer (2) together defining a vertical longitudinal median plane of the articulated vehicle, and the mechanical coupling controlling a trajectory of the trailer (2) during travel of the motorized vehicle (1), said mechanical coupling comprising:

a fixed length pivoting linkage (13) having a front extremity (14) and a rear extremity (17), the front extremity of the pivoting linkage (13) being pivotally connected to a rear portion of the vehicle chassis at a location coincident with the vertical longitudinal median plane of the articulated vehicle, the rear extremity (17) of the pivoting linkage (13) being connected to a pivoting center (18), and the pivoting center (18) being connected to the trailer chassis at a location coincident with the vertical longitudinal median plane of the articulated vehicle;

the pivoting center (18) being connected to the trailer chassis, at a location between a front portion of the trailer and the fixed, forward most non-steerable axle and defining a geometrical pivoting axis (43) for the pivoting linkage (13), the pivoting center further including a sliding connection connecting the pivoting linkage with the trailer, the sliding connection being located between the front extremity and the rear extremity of the pivoting linkage (13), and the pivoting center (18) and the sliding connection being spaced from one another and both being supported by an undersurface of the trailer chassis at a location spaced rearwardly of the front portion of the trailer (2); and a constant length single rod being connected between the vehicle chassis and the trailer chassis, the single rod having opposed first and second ends, the first end of the single rod being connected to a rear corner portion of the vehicle chassis and the second end of the single rod being connected to an opposed front corner portion of the trailer chassis such that the single rod obliquely traverses both the vertical longitudinal median plane of the articulated vehicle and the pivoting linkage (13).

3. The mechanical coupling according to claim 2, wherein the sliding assembly includes a slidable support element (27) which connects the pivoting linkage (13) to the chassis of the trailer (2) to allow displacement of the pivoting linkage (13) relative to the chassis of the trailer (2).

4. The mechanism coupling according to claim 2, wherein the sliding connector further comprises an arc-shaped track (28) which engages and guides the slidable support element (27) along a trajectory of the arc-shaped track (28).

5. An articulated vehicle comprising a motorized vehicle (1) being coupled to a trailer (2) via a mechanical coupling for facilitating transportation of the trailer (2), the motorized vehicle (1) having a vehicle chassis supporting at least two axles with one of the at least two axles being a steerable axle, the trailer (2) having a trailer chassis supporting a pair of non-steerable axles with one of the pair of axles being a fixed, forward most non-steerable axle, the at least two axles of the motorized vehicle (1) and the pair of non-steerable axles of the trailer (2) each supporting rotatable wheels to facilitate movement of the articulated vehicle, the motorized vehicle (1) and the trailer (2) together defining a vertical longitudinal median plane of the articulated vehicle, and the mechanical coupling controlling a trajectory of the trailer (2) during travel of the motorized vehicle (1), said mechanical coupling comprising:

a pivoting linkage (13) having a front extremity (14) and a rear extremity (17), the front extremity of the pivoting linkage (13) being pivotally connected to a rear portion of the vehicle chassis at a location coincident with the vertical longitudinal median plane of the articulated vehicle, the rear extremity (17) of the pivoting linkage (13) being connected to a pivoting center (18), and the pivoting center (18) being connected to the trailer chassis at a location coincident with the vertical longitudinal median plane of the articulated vehicle and remote from a front portion of the trailer;

the pivoting center (18) being connected to the trailer chassis, at a location between the front portion of the trailer (2) and the fixed, forward most non-steerable axle, and defining a geometrical pivoting axis (43) for the pivoting linkage (13), and the pivoting center (18) being spaced from a sliding connection and both being spaced rearwardly of the front portion of the trailer (2) and both being supported by an undersurface of the trailer chassis;

the sliding connection (30) including a support element (27) which additionally connects the pivoting linkage (13) to the trailer chassis, and the support element being simultaneously displaceable with the pivoting linkage (13) relative to the trailer chassis; and a constant length single rod being connected between the vehicle chassis and the trailer chassis, the single rod having opposed first and second ends, the first end of the single rod being connected to a rear corner portion of the vehicle chassis and the second end of the single rod being connected to an opposed front corner portion of the trailer chassis such that the single rod obliquely traverses both the vertical longitudinal median plane of the articulated vehicle and the pivoting linkage (13).

* * * * *